US009245398B2

(12) United States Patent
Plummer

(10) Patent No.: US 9,245,398 B2
(45) Date of Patent: Jan. 26, 2016

(54) INTERACTIVE DOOR SYSTEM TO PROVIDE DOOR ACCESS TO A USER

(71) Applicant: Eric George Plummer, Houston, TX (US)

(72) Inventor: Eric George Plummer, Houston, TX (US)

( * ) Notice: Subject to any disclaimer, the term of this patent is extended or adjusted under 35 U.S.C. 154(b) by 179 days.

(21) Appl. No.: 14/048,860

(22) Filed: Oct. 8, 2013

(65) Prior Publication Data

US 2014/0118109 A1 May 1, 2014

Related U.S. Application Data

(60) Provisional application No. 61/719,176, filed on Oct. 26, 2012.

(51) Int. Cl.
*G05B 19/00* (2006.01)
*G07C 9/00* (2006.01)

(52) U.S. Cl.
CPC ........ *G07C 9/00134* (2013.01); *G07C 9/00896* (2013.01)

(58) Field of Classification Search
None
See application file for complete search history.

(56) References Cited

U.S. PATENT DOCUMENTS

| | | | | |
|---|---|---|---|---|
| 8,331,544 | B2 | 12/2012 | Kraus | |
| 2006/0082454 | A1* | 4/2006 | Fukuda et al. ................ | 340/531 |
| 2008/0218330 | A1* | 9/2008 | Biles et al. .................... | 340/506 |
| 2013/0010120 | A1 | 1/2013 | Nnoruka | |
| 2013/0057695 | A1 | 3/2013 | Huisking | |

* cited by examiner

*Primary Examiner* — Ojiako Nwugo
(74) *Attorney, Agent, or Firm* — Plager Schack LLP

(57) ABSTRACT

An interactive door system is able to validate a first user who seeks access through the door and simultaneously alerts a plurality of devices associated with a second user when the first user is present at the door. The system includes a base unit operably connected to the door and able to unlock a locking mechanism of the door. The base unit includes a monitor, a keypad, a speaker, a camera, a microphone, a biometric scanner, and a communication system able to simultaneously alert the plurality of devices associated with the second user when the first user is present at the door and allow the second user to engage in two-way voice or data communications between any one of the plurality of devices and the base unit. The system allows the second user to determine whether to provide door access to the first user.

6 Claims, 4 Drawing Sheets

INTERACTIVE DOOR SYSTEM TO PROVIDE DOOR ACCESS TO A USER

RELATED APPLICATION

The application claims priority to provisional patent application U.S. Ser. No. 61/719,176 filed on Oct. 26, 2012, the entire contents of which is herein incorporated by reference.

BACKGROUND

The embodiments herein relate generally to systems for monitoring and controlling a user's entry through a door. More specifically, embodiments of the invention relate to a system that allows a homeowner to communicate with and provide door access to a user, regardless of whether the homeowner is present at the home or not.

Currently, there exists several doorbell security systems that allow a homeowner to communicate with a visitor and provide door access to the visitor. These systems include those described in U.S. Pat. No. 8,331,544 and U.S. Patent Applications 2013/0010120 and 2013/0057695. However, these systems are limited because they do not simultaneously alert a plurality of homeowner devices to notify the homeowner of the presence of the visitor. Therefore, it is possible that the homeowner will miss a notification that a visitor is present at the door. Further, these systems are limited because they do not allow the homeowner to remotely sign for mail or packages being delivered to the house.

As such, there is a need in the industry for an interactive door bell system that simultaneously alerts the homeowner on a plurality of devices when a visitor is present. There is a further need for an interactive door bell system that allows the homeowner to remotely sign for mail or packages that are being delivered to the house.

SUMMARY

An interactive door system configured to validate a first user who seeks access through the door is provided. The system is further configured to simultaneously alert a plurality of devices associated with a second user to allow the second user to determine whether to provide door access to the first user. The system comprises a base unit operably connected to the door and configured to unlock a locking mechanism of the door, the base unit comprising a monitor configured to display visual data to the first user, a keypad configured to receive an input from the first user, a speaker configured to provide an audio feed to the user, a camera configured to record a video-feed of the first user, a microphone configured to capture voice data from the first user, a biometric scanner configured to capture biometric data of the first user and a communication system configured to simultaneously alert the plurality of devices associated with the second user when the first user is present at the door and allow the second user to engage in two-way voice or data communications between any one of the plurality of devices and the base unit, wherein the selected second user device is configured to receive the video-feed, voice data or biometric data associated with the first user from the base unit to allow the second user to determine whether to provide door access to the first user.

BRIEF DESCRIPTION OF THE FIGURES

The detailed description of some embodiments of the invention will be made below with reference to the accompanying figures, wherein the figures disclose one or more embodiments of the present invention.

DETAILED DESCRIPTION OF CERTAIN EMBODIMENTS

Figure 1:
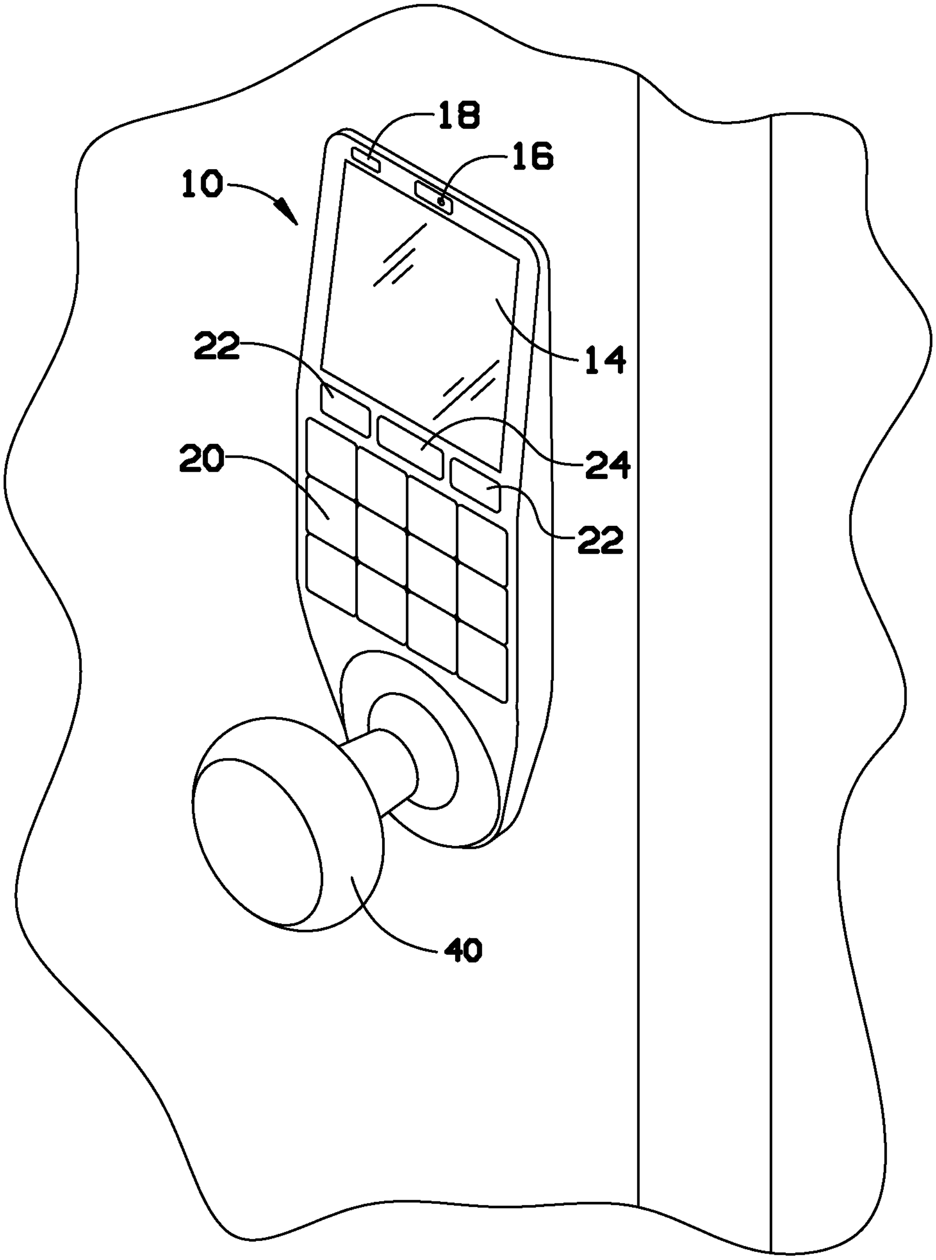
FIG. 1 depicts a perspective view of one embodiment of the door mounted exterior unit.

As depicted in FIG. 1, base unit 10 of the interactive door system comprises monitor 14, camera 16, microphone 18, keypad 20, speakers 22, call button 24 and door knob 40. Monitor 14 may be any type of monitor such as a touch-screen monitor. Base unit 10 further comprises any communication components and/or devices used in the cellular phone industry that can transmit and/or receive data such as voice data and video data to and from other devices. Base unit 10 is operably connected to a locking system of door knob 40 and is configured to lock or unlock door knob 40. In an alternative embodiment, base unit 10 may also include a biometric scanner (not shown), which may include, but is not limited to, a fingerprint scanner, a face scanner or an iris scanner. It shall be appreciated that base unit 10 also comprises various electronic components such as a processor, memory unit, battery and computer programs and/or algorithmic instructions that will carry out the functions of base unit 10.

Figure 2:
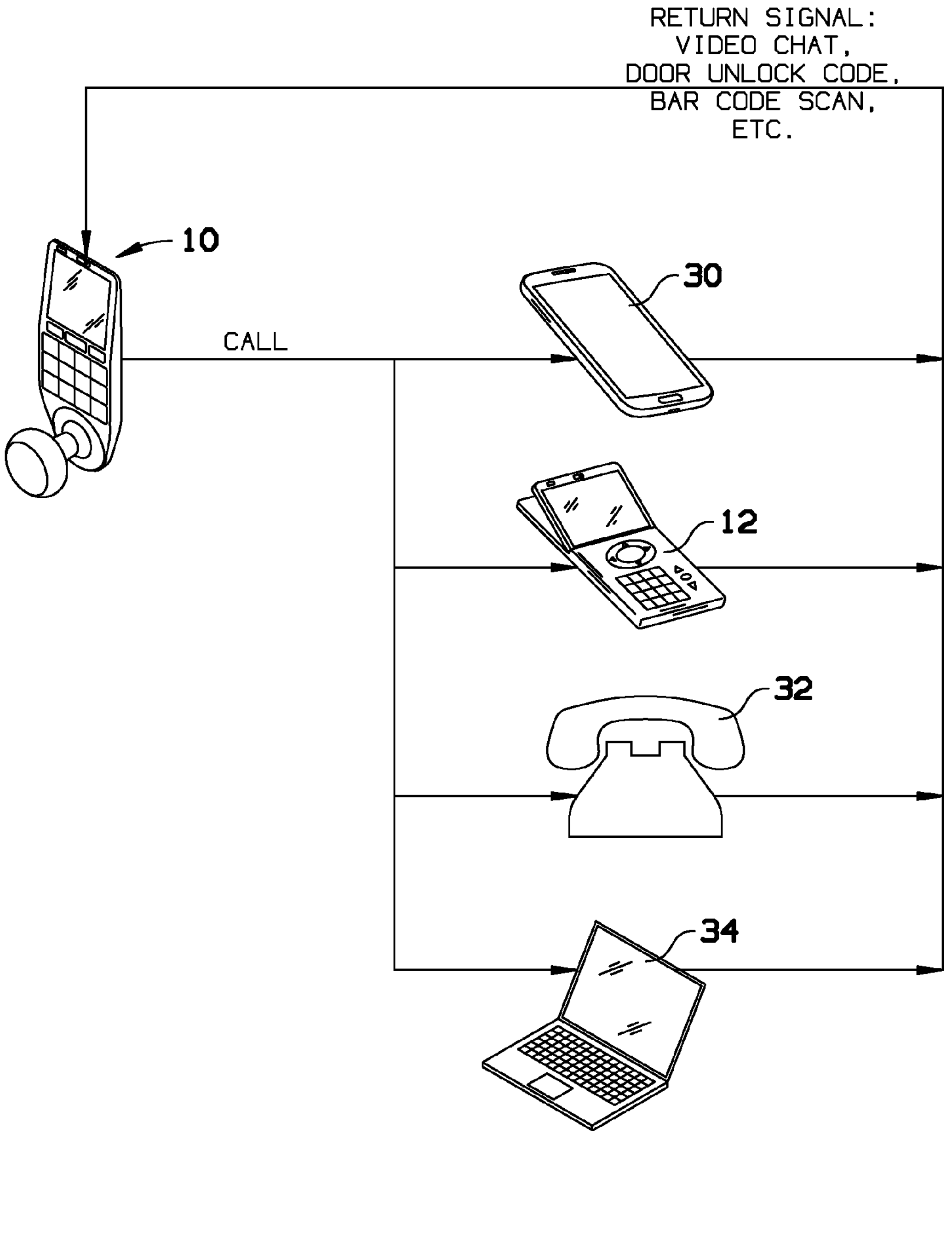
FIG. 2 depicts a schematic view of certain embodiments of the interactive door system.

As depicted in FIG. 2, base unit 10 is operably connected to any of the homeowner's devices, which includes mobile phone 30, indoor receiver unit 12, landline phone 32, and computing device 34. Mobile phone 30 may be any device including, but not limited to, a cellular phone, smartphone, PDA, tablet, or the like. Mobile phone 30 may include a variety of applications or platforms such as an Android Operating System, Blackberry Operating System or iOS Operating System to implement its functions. Computing device 34 may include, but is not limited to, a desktop computer, laptop, or the like.

Figure 3:
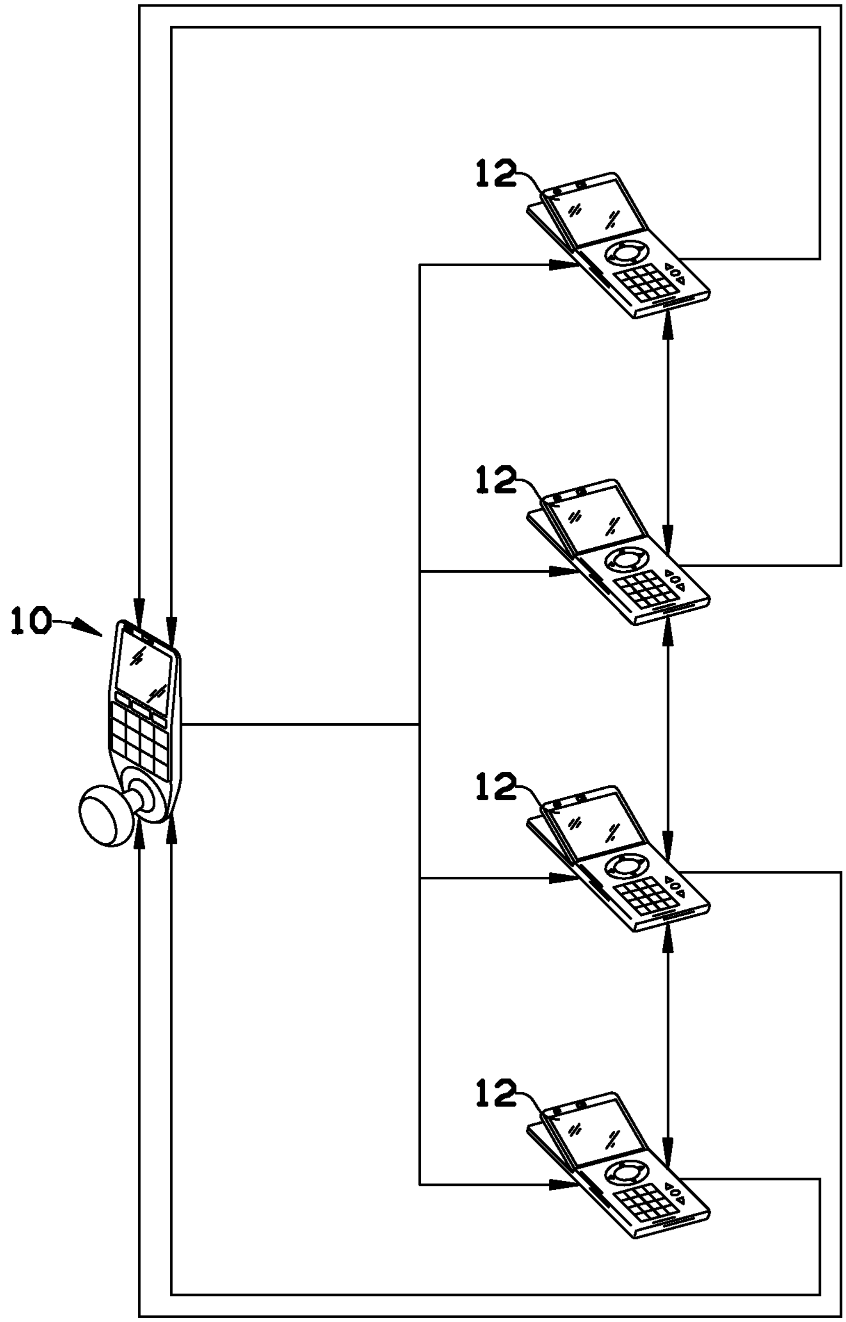
FIG. 3 depicts a schematic view of certain embodiments of the interactive door system.

Base unit 10 may simultaneously alert mobile phone 30, indoor receiver unit 12, landline phone 32 and computing device 34 when a visitor is present at the door, e.g., alert is generated when the visitor pushes call button 24 on base unit 10. It shall be appreciated that data communications between base unit 10 and the homeowner's devices may be carried out using any known technologies in the field including, but not limited to, Wi-Fi, 4G and Bluetooth technologies. As depicted in FIG. 3, in an alternative embodiment of the invention, base unit 10 may communicate with a plurality of indoor receiver units 12. It shall be appreciated that indoor receiver units 12 can also communicate with each other.

Figure 4:
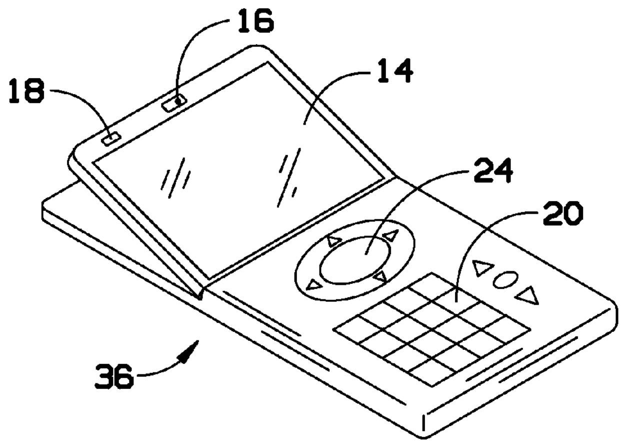
FIG. 4 depicts a perspective view of one embodiment of an indoor receiver unit.
Figure 5:
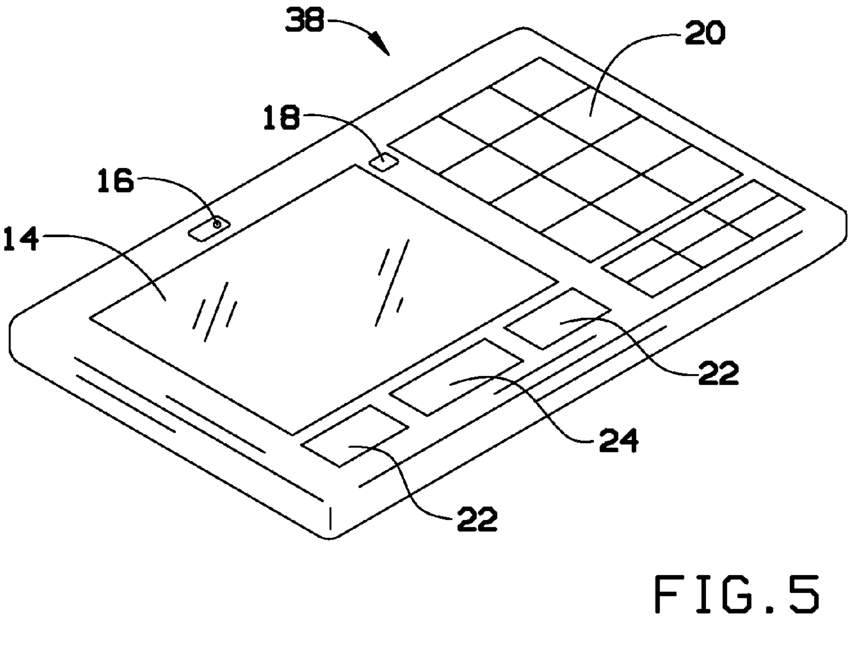
FIG. 5 depicts a perspective view of an alternative embodiment of an indoor receiver unit.

As depicted in FIGS. 4-5, indoor receiver unit 12 may comprise monitor 14, camera 16, microphone 18, keypad 20, speakers 22 and call button 24. In one embodiment 36 of indoor receiver unit 12, the monitor 14 has a foldable screen that may be adjusted using any mounting means such as a hinge. In an alternative embodiment 38 of indoor receiver unit 12, the entire unit may be flat. Monitor 14 may be a touch-screen monitor.

In operation, a visitor can alert the homeowner of his presence at the door by ringing a doorbell system (not shown) via keypad 20 of base unit 10. Instead, the visitor can also push call button 24 on base unit 10. Either one of these actions can simultaneously alert all of the homeowner's devices including mobile phone 30, indoor receiver unit 12, landline phone 32 and computing device 34. The homeowner can use any device to respond to the visitor. When the homeowner responds to the visitor's alert using any one of the devices, the alerts on the remaining devices will terminate. Once the identity of the visitor is verified, the homeowner may use the selected device to transmit instructions to base unit 10 to unlock doorknob 40 to allow the visitor to have access to the door. In an alternative embodiment, base unit 10 may be operably connected to a door system that automatically opens and closes the door when doorknob 40 is unlocked.

In an alternative embodiment of the invention, base unit 10 may comprise a motion sensor or proximity sensor that automatically detects when a visitor arrives at the door. In this embodiment, base unit 10 may automatically present interactive greetings and instructions to the visitor through speakers 22 such as, "How are you doing? How may I help you?" Microphone 18 can capture the visitor's verbal instructions and process the request. The visitor may also enter instructions into base unit 10 by using keypad 20.

Camera 16 of base unit 10 can record a live video feed of the visitor and microphone 18 records the visitor's voice. This video and audio data may be transmitted to mobile phone 30, indoor receiver unit 12 and computing device 34. Similarly, indoor receiver unit 12 may record a live video feed of the homeowner using camera 16 and the homeowner's voice using microphone 18, which is then transmitted to base unit 10. As such, the homeowner and the visitor can engage in two-way live audio and video communications. It shall be appreciated that the homeowner can engage in similar type interactions with the visitor using mobile phone 30 and computing device 34.

In certain embodiments of the invention, the visitor can use keypad 20 of base unit 10 to transmit a message (SMS, email, voicemail or page) to mobile phone 30, indoor receiver unit 12, landline phone 32, and/or computing device 34. In certain embodiments, a biometric scanner (not shown) on base unit 10 may capture biometric data such as fingerprint, face or iris data of the visitor. This biometric data may be transmitted to the homeowner's devices to aid the homeowner in verifying the visitor's identity. In certain embodiments of the invention, the interactive door system can be used in conjunction with a home security system to arm or disarm the security system.

It shall be appreciated that embodiments of the interactive door system may be used in an alternate setting such as an office building. In this situation, base unit 10 may store a phonebook containing any number of contacts such as employees. This allows a visitor to call, email, message or page any contact in the phonebook using base unit 10. It is understood that the phonebook may also be accessible by mobile phone 30, indoor receiver unit 12, landline phone 32 and/or computing device 34. In an alternate embodiment, any of the above-mentioned devices may contain a global positioning system device to locate any user's location.

In an alternative embodiment, the interactive door system can allow the homeowner to sign for mail or packages delivered by delivery personnel or a courier. In this situation, the delivery user will notify the homeowner of his presence at the door by pushing a delivery button on keypad 20 of base unit 10. Monitor 14 will display a barcode associated with the homeowner, which contains contact information such as an email address of the homeowner. The delivery user scans the barcode using an external scanner or tablet, which emails an invoice of the mail or package(s) to be delivered to the homeowner's email address retrieved from the barcode. The homeowner can review the invoice on his/her mobile phone 30, indoor receiver unit 12 or computing device 34, and sign for the mail or package using the device. The homeowner can then provide door access to the delivery user by unlocking the door to allow the package to be dropped off inside the house.

It shall be appreciated that the components of the system described in several embodiments herein may comprise any known materials in the field and be of any color, size and/or dimensions. It shall be appreciated that the components of the system described herein may be manufactured and assembled using any known techniques in the field.

Persons of ordinary skill in the art may appreciate that numerous design configurations may be possible to enjoy the functional benefits of the inventive systems. Thus, given the wide variety of configurations and arrangements of embodiments of the present invention the scope of the invention is reflected by the breadth of the claims below rather than narrowed by the embodiments described above.

What is claimed is:

1. An interactive door system configured to validate a first user who seeks access through the door, the system further configured to simultaneously alert a plurality of devices associated with a second user to allow the second user to determine whether to provide door access to the first user, the system comprising:

a base unit operably connected to the door and configured to unlock a locking mechanism of the door, the base unit comprising:

a monitor configured to display visual data to the first user;

a keypad configured to receive an input from the first user;

a speaker configured to provide an audio feed to the first user;

a camera configured to record a video-feed of the first user;

a microphone configured to capture voice data from the first user;

a biometric scanner configured to capture biometric data of the first user; and a communication system configured to simultaneously alert the plurality of devices associated with the second user when the first user is present at the door and allow the second user to engage in two-way voice or data communications between any one of the plurality of devices and the base unit;

wherein the selected second user device is configured to receive the video-feed, voice data or biometric data associated with the first user from the base unit to allow the second user to determine whether to provide door access to the first user;

wherein the base unit keypad comprises a delivery button, and the monitor of the base unit is configured to display a barcode comprising contact information of the second user when the delivery button is selected by the first user.

2. The system of claim 1, wherein the biometric scanner is a fingerprint scanner, a face scanner or an iris scanner.

3. The system of claim 1, wherein the plurality of devices associated with the second user comprise a computing device, mobile phone, landline phone and an indoor receiver unit.

4. The system of claim 3, wherein the indoor receiver unit comprises a monitor, a keypad, a speaker, a camera, a microphone, and a communication system.

5. The system of claim 4, wherein the first user is a mail or package delivery user.

6. The system of claim 1, wherein the selected device associated with the second user is configured to allow the second user to sign for a mail or package to be delivered by the first user.

* * * * *